United States Patent
Duluk, Jr. et al.

(10) Patent No.: US 8,619,087 B2
(45) Date of Patent: Dec. 31, 2013

(54) INTER-SHADER ATTRIBUTE BUFFER OPTIMIZATION

(75) Inventors: Jerome F. Duluk, Jr., Palo Alto, CA (US); Gernot Schaufler, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 377 days.

(21) Appl. No.: 12/895,579

(22) Filed: Sep. 30, 2010

(65) Prior Publication Data

US 2011/0080415 A1    Apr. 7, 2011

Related U.S. Application Data

(60) Provisional application No. 61/249,220, filed on Oct. 6, 2009.

(51) Int. Cl.
*G06T 1/20* (2006.01)

(52) U.S. Cl.
USPC ............ 345/506; 345/473; 345/572; 345/418

(58) Field of Classification Search
USPC ........................................................ 345/506
See application file for complete search history.

(56) References Cited

U.S. PATENT DOCUMENTS

| | | | |
|---|---|---|---|
| 6,529,284 B1 * | 3/2003 | Ganapathy et al. | 358/1.11 |
| 6,765,584 B1 * | 7/2004 | Wloka et al. | 345/584 |
| 6,825,843 B2 * | 11/2004 | Allen et al. | 345/522 |
| 7,202,872 B2 * | 4/2007 | Paltashev et al. | 345/555 |
| 7,274,369 B1 * | 9/2007 | Bastos et al. | 345/531 |
| 7,508,394 B1 * | 3/2009 | Papakipos et al. | 345/506 |
| 7,570,267 B2 * | 8/2009 | Patel et al. | 345/522 |
| 7,692,660 B2 * | 4/2010 | Markovic et al. | 345/522 |
| 7,697,008 B1 * | 4/2010 | Lindholm et al. | 345/522 |
| 7,746,347 B1 * | 6/2010 | Brown et al. | 345/522 |

(Continued)

OTHER PUBLICATIONS

Buck, I., Foley, T., Horn, D., Sugerman, J., Fatahalian, K., Houston, M., and Hanrahan, P., "Brook for GPUs: Stream computing on graphics hardware", ACM Trans. on Graphics (Proc. SIGGRAPH) 23, Aug. 3, 2004.*

(Continued)

*Primary Examiner* — Ryan R Yang
*Assistant Examiner* — Jin Ge
(74) *Attorney, Agent, or Firm* — Patterson & Sheridan, L.L.P.

(57) ABSTRACT

One embodiment of the present invention sets forth a technique for reducing the amount of memory required to store vertex data processed within a processing pipeline that includes a plurality of shading engines. The method includes determining a first active shading engine and a second active shading engine included within the processing pipeline, wherein the second active shading engine receives vertex data output by the first active shading engine. An output map is received and indicates one or more attributes that are included in the vertex data and output by the first active shading engine. An input map is received and indicates one or more attributes that are included in the vertex data and received by the second active shading engine from the first active shading engine. Then, a buffer map is generated based on the input map, the output map, and a pre-defined set of rules that includes rule data associated with both the first shading engine and the second shading engine, wherein the buffer map indicates one or more attributes that are included in the vertex data and stored in a memory that is accessible by both the first active shading engine and the second active shading engine.

20 Claims, 9 Drawing Sheets

(56) References Cited

U.S. PATENT DOCUMENTS

| | | | | |
|---|---|---|---|---|
| 7,750,913 | B1* | 7/2010 | Parenteau et al. | 345/502 |
| 7,755,634 | B1* | 7/2010 | Lindholm et al. | 345/561 |
| 7,791,604 | B2* | 9/2010 | Tomikawa et al. | 345/441 |
| 7,830,392 | B1* | 11/2010 | Danskin et al. | 345/544 |
| 7,839,410 | B1* | 11/2010 | Brown et al. | 345/541 |
| 7,852,345 | B1* | 12/2010 | Brown et al. | 345/541 |
| 7,928,989 | B1* | 4/2011 | Brown et al. | 345/543 |
| 8,044,951 | B1* | 10/2011 | Brown et al. | 345/419 |
| 8,081,184 | B1* | 12/2011 | Nordquist | 345/426 |
| 8,174,531 | B1* | 5/2012 | Lindholm et al. | 345/505 |
| 8,174,534 | B2* | 5/2012 | Jiao | 345/582 |
| 8,223,158 | B1* | 7/2012 | Lindholm et al. | 345/506 |
| 2003/0164835 | A1* | 9/2003 | Burk et al. | 345/506 |
| 2003/0179203 | A1* | 9/2003 | Bruderlin et al. | 345/473 |
| 2006/0038811 | A1* | 2/2006 | Owens et al. | 345/418 |
| 2007/0070079 | A1* | 3/2007 | Chung et al. | 345/582 |
| 2008/0001952 | A1* | 1/2008 | Srinivasan et al. | 345/502 |
| 2008/0001956 | A1* | 1/2008 | Markovic et al. | 345/522 |
| 2008/0266286 | A1* | 10/2008 | Ramey et al. | 345/419 |
| 2009/0055632 | A1* | 2/2009 | Chen | 712/227 |
| 2009/0085919 | A1* | 4/2009 | Chen et al. | 345/520 |
| 2009/0189909 | A1* | 7/2009 | Jiao et al. | 345/506 |
| 2011/0063313 | A1* | 3/2011 | Bolz et al. | 345/531 |
| 2011/0141122 | A1* | 6/2011 | Hakura et al. | 345/505 |

OTHER PUBLICATIONS

Proudfoot, K., Mark, W. R., Hanrahan, P., and Tzvetkov, S., A real-time procedural shading system for programmable graphics hardware. Computer Graphics (Proc. SIGGRAPH) (Aug.), 159-170, 2001.*

McCool M., Du Toit S., Popa T., Chan B., "Moule K.: Shader algebra". ACM Trans. on Graphics 23(3):787-795, Aug. 2004.*

E. Lindholm, J. Nickolls, S. Oberman, J. Montrym, "NVIDIA Tesla: A unified graphics and computing architecture", IEEE Micro, 28 (2) (2008), pp. 39-55.*

Emmett Kilgariff, Randima Fernando, "GPU Gems 2, Chapter 30, The GeForce 6 Series GPU Architecture", 2005.*

Cem Cebenoyan, "GPU Gems 2, Chapter 28, Graphics Pipeline Performance", 2005.*

R. Fernando, M. Harris, M. Wioka, and C. Zeller. Programming graphics hardware. In Eurographics, 2004.*

Koji Ashida, "Optimising the Graphics Pipeline", 2004.*

Shawn Hargreaves, "Combining shaders", http://blogs.msdn.com/b/shawnhar/archive/2009/08/17/combining-shaders.aspx, Aug. 17, 2009.*

Ju-Ho Sohn , Ramchan Woo , Hoi-Jun Yoo, A programmable vertex shader with fixed-point SIMD datapath for low power wireless applications, Proceedings of the ACM SIGGRAPH/EUROGRAPHICS conference on Graphics hardware, Aug. 29-30, 2004, Grenoble, France.*

Tae-Ryoung Park ; Jae-Chang Kwak ; Yong-Seo Koo, "A Design of Multi-threaded Shader Processor with Dual-Phase Pipeline Architecture", Advances in Multimedia, 2009. MMEDIA '09. First International Conference on Jul. 20-25, 2009, pp. 121-124.*

Chang-Hyo Yu ; Donghyun Kim ; Lee-Sup Kim,"A Dual-Shader 3-D Graphics Processor With Fast 4-D Vector Inner Product Units and Power-Aware Texture Cache", Very Large Scale Integration (VLSI) Systems, IEEE Transactions on Apr. 2011, pp. 525-537.*

* cited by examiner

INTER-SHADER ATTRIBUTE BUFFER OPTIMIZATION

CROSS-REFERENCE TO RELATED APPLICATIONS

This application claims priority benefit to U.S. provisional patent application titled, "INTER-SHADER ATTRIBUTE BUFFER OPTIMIZATION" filed on Oct. 6, 2009 and having Ser. No. 61/249,220.

BACKGROUND OF THE INVENTION

1. Field of the Invention

The present invention generally relates to computer graphics and more particularly to a method and system for connecting multiple shaders.

2. Description of the Related Art

Unless otherwise indicated herein, the approaches described in this section are not prior art to the claims in this application and are not admitted to be prior art by inclusion in this section.

Over the past decade, graphics hardware has gone from a simple memory device to a configurable device and relatively recently, to a programmable graphics processing unit (GPU). To fully realize the parallel processing capabilities of a GPU, as much GPU functionality as possible needs to be programmable and be exposed to developers. Among other things, doing so enables developers to tailor their shader programs to optimize the way a GPU processes graphics scenes and images. In a prior art approach, a GPU includes a series of processing units, each is configured to carry out a different and often dedicated function of a graphics pipeline, where the output of one processing unit is the input to the next processing unit in the chain. Some of these processing units in the graphics pipeline are programmable, such as a vertex processing unit and a fragment processing unit, but other processing units perform fixed functions, such as a primitive assembler, a geometry processor, and a rasterizer.

The aforementioned prior art approach has some shortcomings. First, without full programmability, the graphics pipeline is unable to efficiently respond to changes in Application Programming Interface (API), such as OpenGL and DirectX, or address any bugs identified to be associated with the pipeline. Second, because many functions of the graphics pipeline and the sequence of performing such functions are fixed, a graphics application utilizing the graphics pipeline does not have the full flexibility to maneuver various shader programs, such as invoking shader programs in a different sequence than the sequence of the pipeline stages (e.g., invoking a geometry shader ahead of a vertex shader) or repeating a particular shader program multiple times (e.g., invoking a vertex shader six times). Even with workaround approaches capable of emulating the maneuvering of various shader programs on the prior art system, these approaches are cumbersome to implement and are inefficient to operate. For example, one workaround approach is to configure a graphics pipeline to execute a particular shader program, stream the output of the shader program into a frame buffer, reconfigure the graphics pipeline to execute another shader program, re-inject the stored data from the frame buffer back to the reconfigured pipeline for processing, and repeat these steps until all the shader programs are processed in a specific sequence. The repeated configurations of the graphics pipeline and the accesses of the frame buffer consumes significant processing and memory resources and introduces undesirable delays. Another workaround approach involves merging the multiple shader programs and recompiling the merged program to generate a single all-encompassing shader program for the graphics pipeline to process. However, this approach is inefficient, because if any of the shader programs or the sequence of executing the shader programs needs to be altered, then these extra steps of merging and compiling also need to be repeated.

Lastly, the prior art approach does not support a mechanism that reconciles different input and output requirements of multiple shader programs. To illustrate, suppose a first shader program to be executed by a prior art GPU requests for 40 outputs but a second shader program, coupled to the first shader program, only requests for 6 inputs. In other words, the second shader program is designed to read only 6 of the 40 outputs from the first shader program. Without considering the requirements of the second shader program, the GPU still allocates the resources for all 40 outputs for the first shader program.

As the foregoing illustrates, what is needed in the art is a method and system for supporting a user-configurable graphics pipeline capable of efficiently managing storage of inputs and outputs between shader programs.

SUMMARY OF THE INVENTION

One embodiment of the present invention sets forth a technique for reducing the amount of memory required to store vertex data processed within a processing pipeline that includes a plurality of shading engines. The method includes determining a first active shading engine and a second active shading engine included within the processing pipeline, wherein the second active shading engine receives vertex data output by the first active shading engine. An output map is received and indicates one or more attributes that are included in the vertex data and output by the first active shading engine. An input map is received and indicates one or more attributes that are included in the vertex data and received by the second active shading engine from the first active shading engine. Then, a buffer map is generated based on the input map, the output map, and a pre-defined set of rules that includes rule data associated with both the first shading engine and the second shading engine, wherein the buffer map indicates one or more attributes that are included in the vertex data and stored in a memory that is accessible by both the first active shading engine and the second active shading engine.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
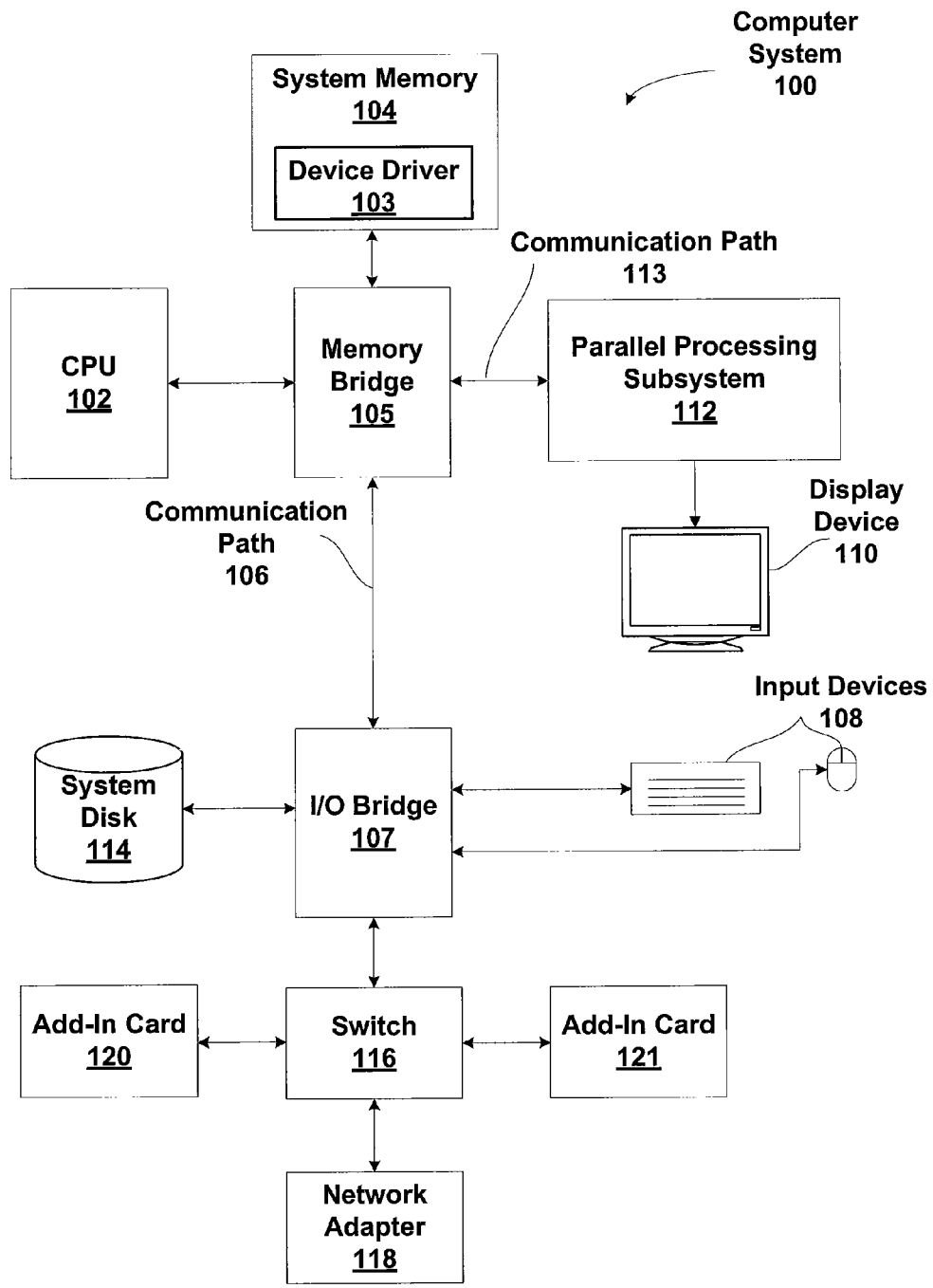
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
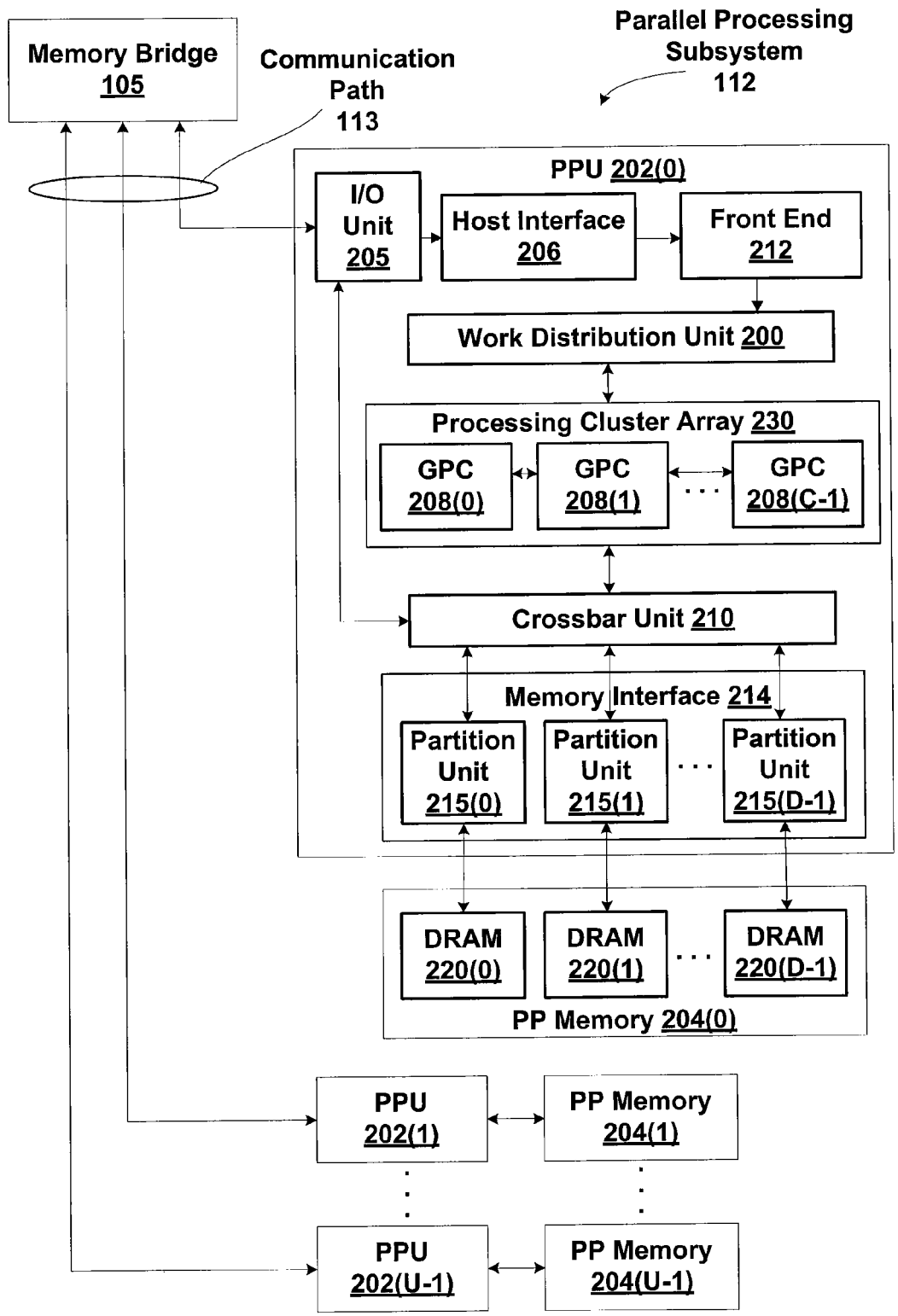
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
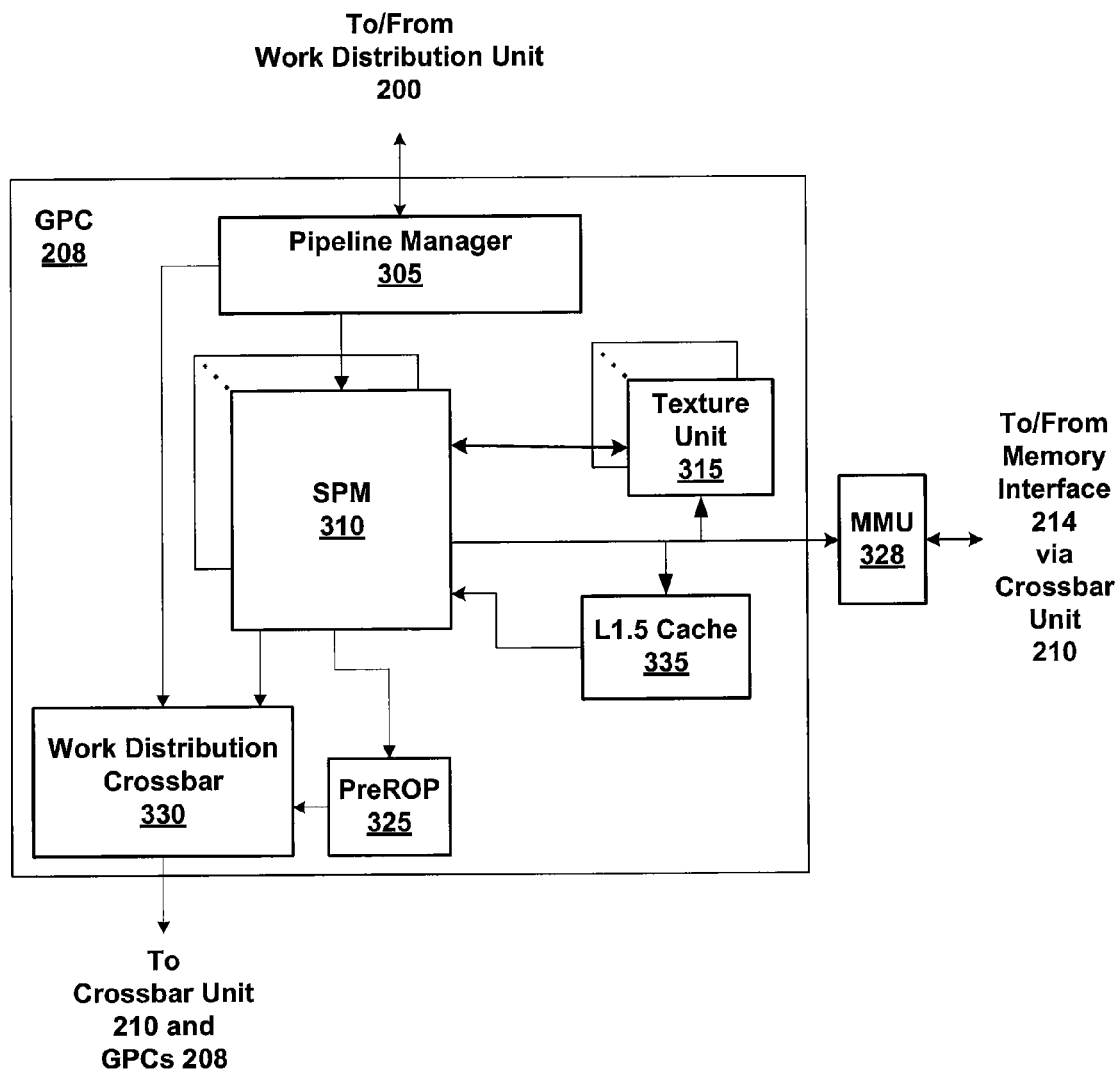
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
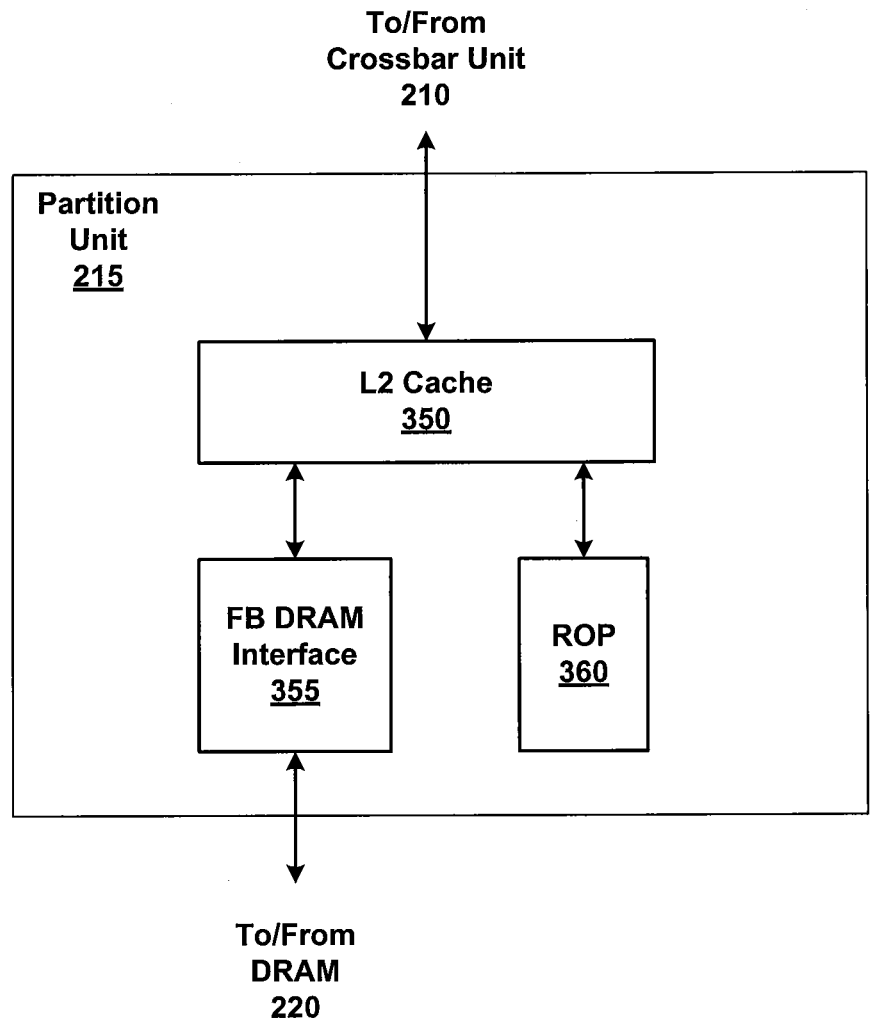
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of the thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
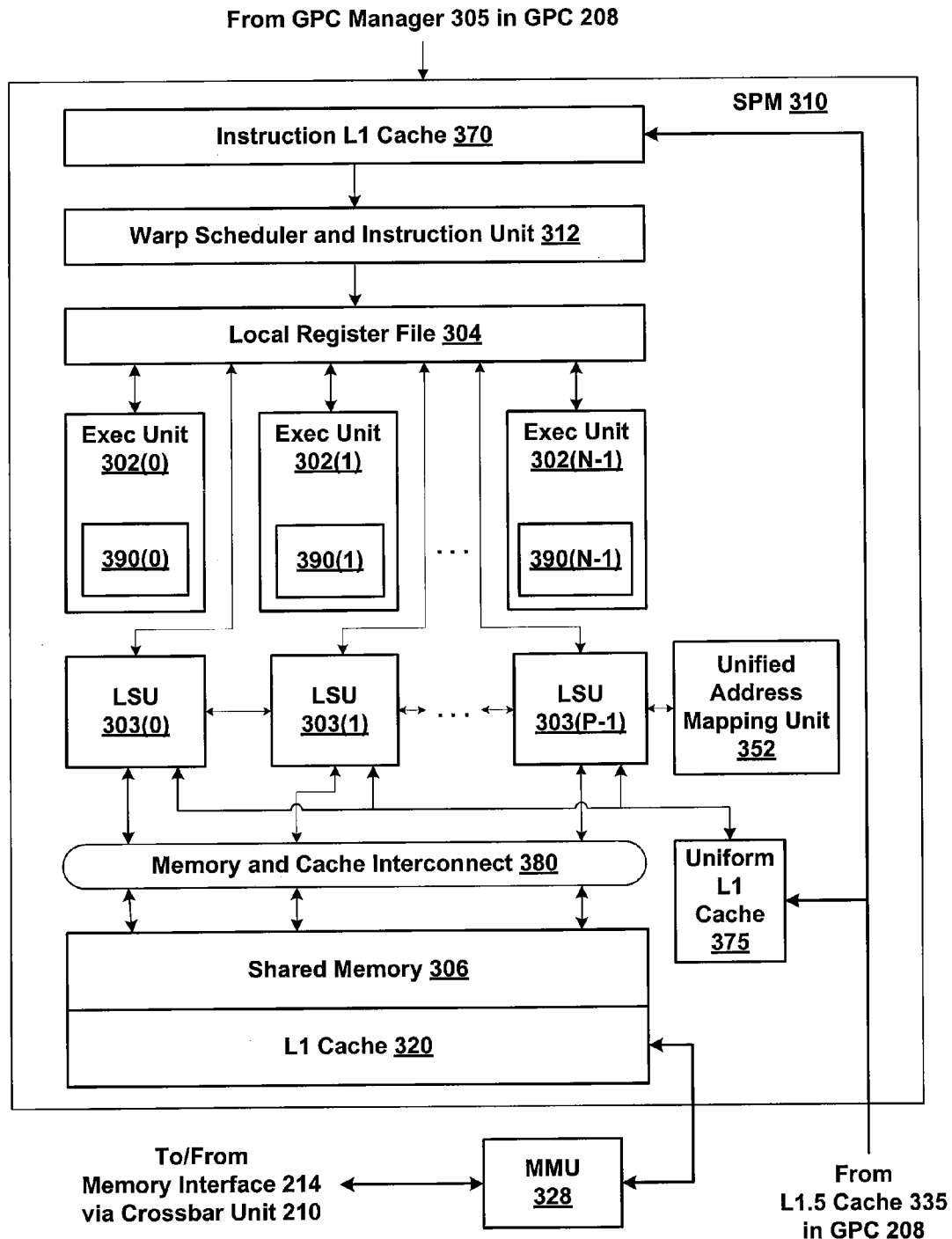
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 375, the shared memory 306, and the L1 cache 320 via a memory and cache interconnect 380. The uniform L1 cache 375 is configured to receive read-only data and constants from memory via the L1.5 Cache 335.

Figure 4:
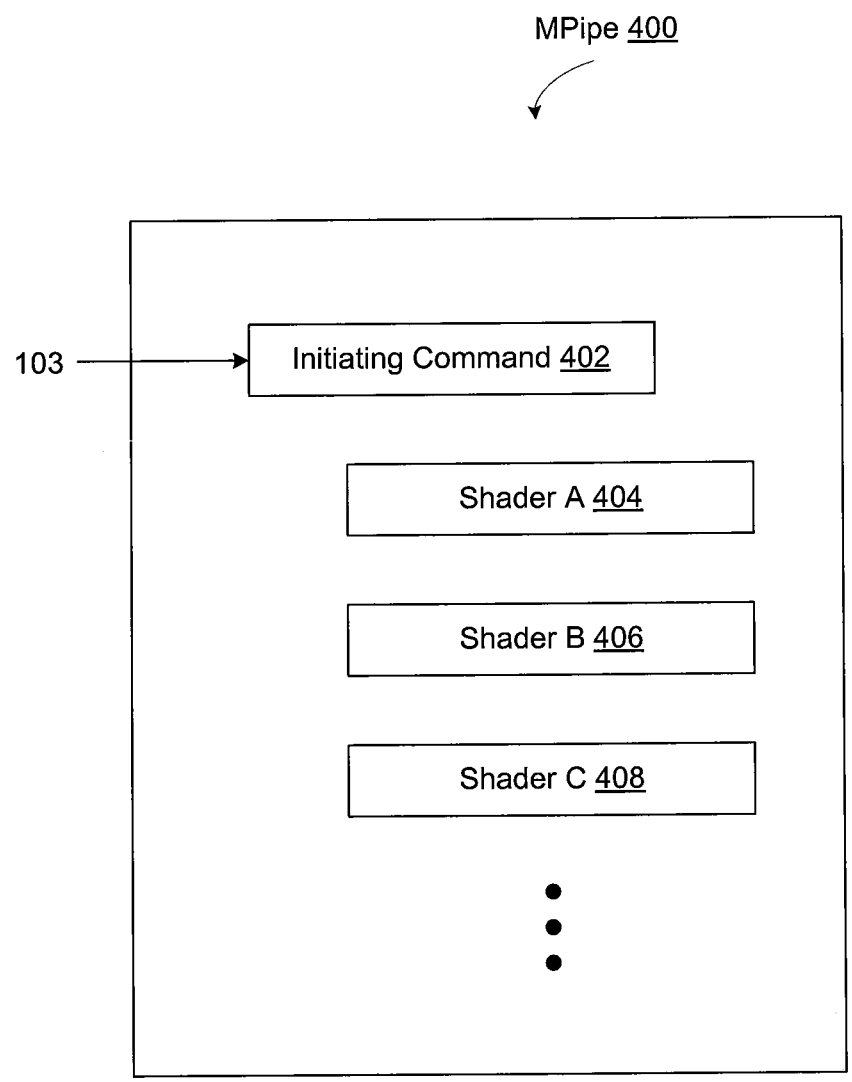
FIG. 4 is a conceptual diagram of a generic module pipe (MPipe), according to one embodiment of the invention.

FIG. 4 is a conceptual diagram of a module pipe (MPipe) 400 configured to execute a plurality of shaders within one or more SPMs 310, according to one embodiment of the invention. As shown, MPipe 400 includes a set of shaders, such as shader A 404, shader B 406, and shader C 408. An initiating command 402 or a plurality of commands from device driver 103 triggers the creation of an instance of the MPipe. In one embodiment, after all the shaders in the MPipe complete in execution, the instance of the MPipe is terminated, and if termination of the instance is desired before the completion of execution of all the shaders, then device driver 103 issues a kill command to stop further execution of input work packets. Upon receiving initiating command 402, SPM 310 creates an instance of MPipe 400 with the shaders configured in a user-defined sequence shown in FIG. 4. The sequence in FIG. 4 may correspond to the sequence of shaders in a standard API, such as DirectX or OpenGL. SPM 310 executes these shaders in a sequence to operate on a set of input data. The shaders can form a linear processing list, where shader A 404 may receive input in the form of vertices, the output from shader A 404 forms the input to shader B 406, and the output from shader B 406 forms the input to shader C 408. In an alternative configuration, the output from shader A 404 forms the input for both shader B 406 and shader C 408 in a tree-like arrangement. It should be noted that the connectivity among the shaders is configurable, and the configuration for MPipe 400 can be any type of directed graph. Also, MPipe 400 also supports replicating any shader within the MPipe. For instance, although vertex processing occurs prior to geometry processing in a traditional graphics pipeline, MPipe 400 may be configured to have a vertex shader after a geometry shader. Also, instead of performing vertex processing once in a single pass through the traditional graphics pipeline, MPipe 400 may be configured to have multiple, successive vertex shaders. In addition, each of the shaders can be of a different type. For example, in one implementation, shader A 404 is a vertex shader, shader B 406 is a tessellation shader, and shader C 408 is a geometry shader. Such an MPipe is referred to as a geometry MPipe. In another implementation, however, all the shaders in MPipe 400 are of the same type, such as vertex shaders.

To ensure resources are efficiently utilized to execute the various shaders in MPipe 400, one approach is to match the expected output of a first shader at a current stage and the expected input of a second shader at an immediately subsequent stage. Specifically, a shader typically has a shader header, which is generated by a compiler along with executable program instructions and includes an input map (IMap) and an output map (OMap). The IMap describes the input that the shader expects to receive, and the OMap describes the output that the shader expects to generate. The logical AND between the OMap of the first shader and the IMap of the second shader is referred to as a "buffer map" (BMap).

Figure 5:
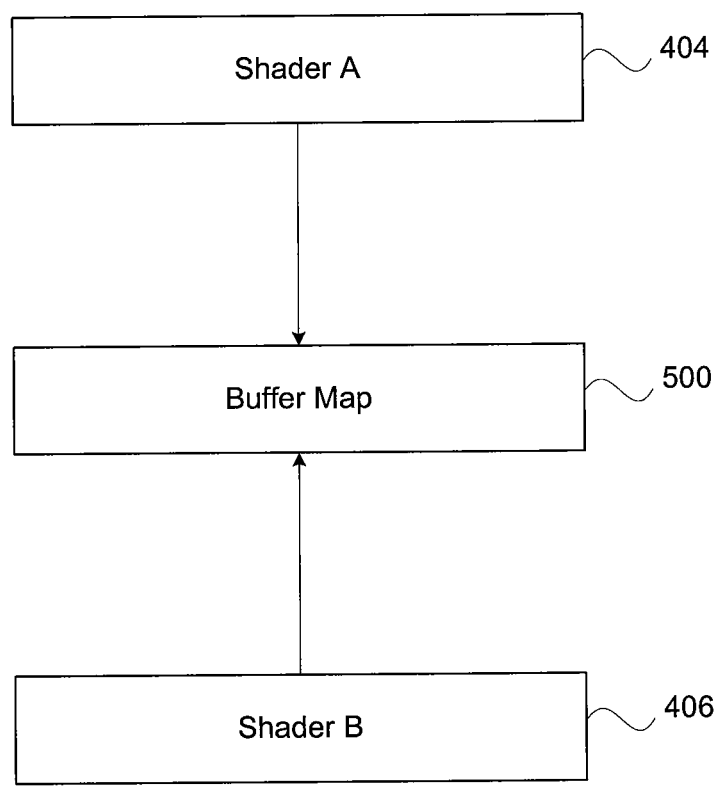
FIG. 5 is a conceptual diagram of a buffer map in between two shaders, according to one embodiment of the invention.

FIG. 5 is a conceptual diagram of a BMap 500 in between shader A 404 and shader B 406, according to one embodiment of the invention. Continuing with the example of MPipe 400, SPM 310 establishes BMap 500 to determine the appropriate resources to allocate at the output of shader A 404 and at the input of shader B 406. To illustrate, suppose, in a first scenario, the OMap of shader A 404 contains vertex attributes of a, b, and c, and the IMap of shader B 406 contains vertex attributes of b and c. In one embodiment, the IMap is represented using a bitmask, where each bit included in the bitmask corresponds to a different vertex attribute (e.g., vertex attributes a, b and c). A value of 1 for each bit in the bitmask indicates that the corresponding attribute is to be maintained, while a value of 0 for each bit in the bitmask indicates that the corresponding attribute may be discarded. Thus, the bits included in the IMap and the OMap are compared against one another to identify any similarities in resources that are expected by shader A 404 and shader B 406.

Upon completion of the BMap, whenever shader A 404 generates an output including the attribute of a, SPM 310 recognizes that a is not in BMap 500 and thus removes a before it reaches shader B 406. In other words, instead of allocating resources for a, b, and c, only the resources for b and c are allocated. In a second scenario, suppose the OMap of shader A 404 still contains attributes of a, b, and c, but the IMap of shader B 406 contains b, c, and d. Here, before shader B 406 reads its input, SPM 310 recognizes that d is not in BMap 500 and thus adds a default value (e.g., {0,0,0,1} for a vector or 1.0 for a scalar) in place of d. Accordingly, with BMap 500, only the needed resources are allocated, and the remaining resources can be reserved for operating additional instances of MPipe 400. Both of the aforementioned scenarios assume the output from one shader (e.g., shader A 404) is used as input for also only one shader (e.g., shader B 406), and each entry in BMap 500 is the result of performing a custom AND operation between bits included in an OMap and an IMap, and further between corresponding entries included in an Attribute Address Map Table (AAMT) and a BMap Generation Truth Table, described in further detail below.

Table 1 sets forth a format of an AAMT, according to one embodiment of the present invention. As shown, Table 1 includes one or more rows, where each row corresponds to an attribute of a vertex, such as a vertex identification code (herein referred to as "VertexID") or x-coordinate of the vertex (herein referred to as "PositionX"). Each of the rows for the vertex attributes comprises one or more columns, where each column associated with a particular shader type that may be enabled in the MPipe 400—such as a vertex shader, a tessellation shader, and a geometry shader. Included in each column are a first and a second keyword, where the first keyword specifies a configuration type for an "IDMap" of the associated shader, and where the second keyword specifies a configuration type for an "ODMap" of the associated shader. The keyword that is associated with each of the IDMap and ODMap provide additional configuration parameters that are considered by the custom AND operation to provide optimizations when connecting the output of one shader to the input of a successive shader. In one embodiment, seven keyword types are considered, each described in detail below.

TABLE 1

Attribute Address Map Table.

| | Shader 1 | | Shader 2 | | ... | Shader N | |
|---|---|---|---|---|---|---|---|
| | IDMap | ODMap | IDMap | ODMap | ... | IDMap | ODMap |
| Attribute 1 | Keyword | Keyword | Keyword | Keyword | ... | Keyword | Keyword |
| Attribute 2 | Keyword | Keyword | Keyword | Keyword | ... | Keyword | Keyword |
| . | . | . | . | . | ... | . | . |
| . | . | . | . | . | ... | . | . |
| . | . | . | . | . | ... | . | . |
| Attribute X | Keyword | Keyword | Keyword | Keyword | ... | Keyword | Keyword |

The first keyword type, "Load (LD)," indicates that the associated shader may load the corresponding vertex attribute from the memory if a value for that vertex attribute is present in the memory. Otherwise, if the value is not present in the memory, then a default value is loaded.

The second keyword type, "Store (ST)," indicates that the associated shader may store the corresponding vertex attribute in the memory if a downstream shader requires the vertex attribute. Otherwise, the vertex attribute is discarded.

The third keyword type, "Load Required (LD_REQ)," causes the corresponding bit in the BMap generated by the custom AND operation to always be set to a value of 1 when the corresponding IMap bit is a value of 1.

The fourth keyword type, "Store Required (ST_REQ)," causes the corresponding bit in the BMap generated by the custom AND operation to always be set to a value of 1 when the corresponding OMap bit is a value of 1, which enables a shader to subsequently read a vertex attribute output and to use the vertex attribute output as an input to perform further processing on the vertex attribute.

The fifth keyword type, "Store Last (ST_LAST)," indicates that, if the shader is the last enabled shader in the MPipe 400, then the OMap is configured with respect to the rules of ST_REQ keyword described above. Otherwise, the OMap is configured with respect to the rules of the ST keyword, also described above.

The sixth keyword type, "DEFAULT", indicates that an error should occur if a value of 1 is present in the IMap. The DEFAULT keyword also indicates that, for any attribute load that is performed, a default value is received. However, if the OMap of the previous shader specifies the ST_REQ keyword and the OMap bit is 1, then the vertex attribute output from the previous shader is received. Further, if an interpolation is performed, then a value of zero is received.

The seventh and final keyword type, "DISCARD," indicates that an error should occur when the OMap bit is 1. The DISCARD keyword also indicates that, if an attribute store operation is performed, then the resulting attribute data is discarded regardless of the IMap bit of the subsequent shader.

To generate a BMap between the first shader and the second shader, each of the corresponding keywords specified within an AAMT, along with the OMap of the first shader and the IMap of the second shader, are used in conjunction with the BMap Generation Truth Table shown in Table 3. As such, consider an example where a BMap for a two-attribute vertex is generated between a vertex shader and a geometry shader. For this example, a Table 2 is included below, which is formatted according to the AAMT set forth in Table 1 and populated with example data.

TABLE 2

AAMT Populated with Example Data.

| | Vertex Shader | | Geometry Shader | |
|---|---|---|---|---|
| | IDMap | ODMap | IDMap | ODMap |
| VertexID | LD_REQ | ST | LD | ST |
| PositionX | default | ST | LD | ST |

As shown, Table 2 includes a row for each of the attributes that comprise the vertex—in this case, the VertexID attribute and the PositionX attribute. Table 2 further includes, for each of the vertex shader and geometry shader, one keyword that specifies a configuration type corresponding to the IDMap, and another keyword that specifies a configuration type corresponding to the ODMap. In this example, the vertex shader precedes the geometry shader in the MPipe 400 such that the geometry shader receives vertex data output by the vertex shader. Accordingly, to generate the BMap bits for each of the VertexID and PositionX vertex attributes, a logic operation is performed according to the truth table shown in Table 3, operating on each of the ODMap keywords of the vertex shader, the corresponding IDMap keywords of the geometry shader, the corresponding bit values included in the vertex shader's Omap, and the corresponding bit values included in the geometry shader's IMap.

Continuing with the example described above, in Table 3, the column "Omap[n]" represents an nth bit of the vertex shader's OMap, while the column "Imap[n]" represents an nth bit of the geometry shader's IMap. The columns "Odmap [n]" and "Idmap[n]" correspond to the IDMap and ODMap keywords specified in the Table 1 and control the behavior of the logic operation that is used to generate the final BMap bits between the vertex shader and the geometry shader.

Thus, to determine the BMap bit for each of the attributes, the corresponding OMap bit of the vertex shader—which may be a value of 1 or 0, depending on the configuration of the vertex shader—is compared against the value of the IMap bit of the geometry shader, the ODMap keyword type of the vertex shader, and the IDMap keyword type of the geometry shader.

For example, with respect to the VertexID vertex attribute, if the OMap of the Vertex Shader is a value of 1 and the IMap of the Geometry Shader is a value of 0, then the resultant value of the BMap bit corresponding to the VertexID vertex attribute is 0. Similarly, with respect to the PositionX vertex attribute, if the OMap of the Vertex Shader is a value of 1 and the IMap of the Geometry Shader is a value of 1, then the resultant value of the BMap bit corresponding to the PositionX vertex attribute is 1.

TABLE 3

BMap Generation Truth Table

| Odmap [n] | Omap [n] | Idmap [n] | Imap [n] | Bmap [n] |
|---|---|---|---|---|
| ST | 0 | LD | 0 | 0 |
| ST | 0 | LD | 1 | 0 |
| ST | 0 | LD_REQ | 0 | 0 |
| ST | 0 | LD_REQ | 1 | 1 |
| ST | 0 | default | 0 | 0 |
| ST | 0 | default | 1 | 0 |
| ST | 1 | LD | 0 | 0 |
| ST | 1 | LD | 1 | 1 |
| ST | 1 | LD_REQ | 0 | 0 |
| ST | 1 | LD_REQ | 1 | 1 |
| ST | 1 | default | 0 | 0 |
| ST | 1 | default | 1 | 0 |
| ST_REQ | 0 | LD | 0 | 0 |
| ST_REQ | 0 | LD | 1 | 0 |
| ST_REQ | 0 | LD_REQ | 0 | 0 |
| ST_REQ | 0 | LD_REQ | 1 | 1 |
| ST_REQ | 0 | default | 0 | 0 |
| ST_REQ | 0 | default | 1 | 0 |
| ST_REQ | 1 | LD | 0 | 1 |
| ST_REQ | 1 | LD | 1 | 1 |
| ST_REQ | 1 | LD_REQ | 0 | 1 |
| ST_REQ | 1 | LD_REQ | 1 | 1 |
| ST_REQ | 1 | default | 0 | 1 |
| ST_REQ | 1 | default | 1 | 1 |
| discard | 0 | LD | 0 | 0 |
| discard | 0 | LD | 1 | 0 |
| discard | 0 | LD_REQ | 0 | 0 |
| discard | 0 | LD_REQ | 1 | 1 |
| discard | 0 | default | 0 | 0 |
| discard | 0 | default | 1 | 0 |
| discard | 1 | LD | 0 | 0 |
| discard | 1 | LD | 1 | 0 |
| discard | 1 | LD_REQ | 0 | 0 |
| discard | 1 | LD_REQ | 1 | 1 |
| discard | 1 | default | 0 | 0 |
| discard | 1 | default | 1 | 0 |

To illustrate aspects of Table 3, consider the 19$^{th}$ row, that has Odmap[n]=ST_REQ, Omap[n]=1, Idmap[n]=LD, Imap [n]=0, and Bmap[n]=1. In this case, the upstream shader is outputting attribute[n], as indicated by Omap[n]=1, but the downstream shader is not going to read attribute[n], as indicated by Imap[n]=0. If attribute[n] was not used for anything else, it would make sense to have Bmap[n]=0, because the attribute is not passed from the upstream shader to the downstream shader. However, attribute[n] gets special treatment due to having Odmap[n]=ST_REQ. With Odmap[n]= ST_REQ, Bmap[n]=1, even though Imap[n]=0. The 19$^{th}$ row of Table 3 is applicable to special attributes, such as DirectX's RenderTargetArrayIndex, which is an index used to select amongst indexed render targets, but only if it is present at the Geometry Shader output, otherwise, index 0 is used. In this API, RenderTargetArray is needed in the ISBE whenever it is generated, even if downstream shaders do not read it. A similar example is DirectX's ViewportIndex attribute. In Table 3, special handling of the attribute is indicated by any row where Bmap[n] is not equal to the logical AND of Imap[n] and Omap[n].

Figure 6:
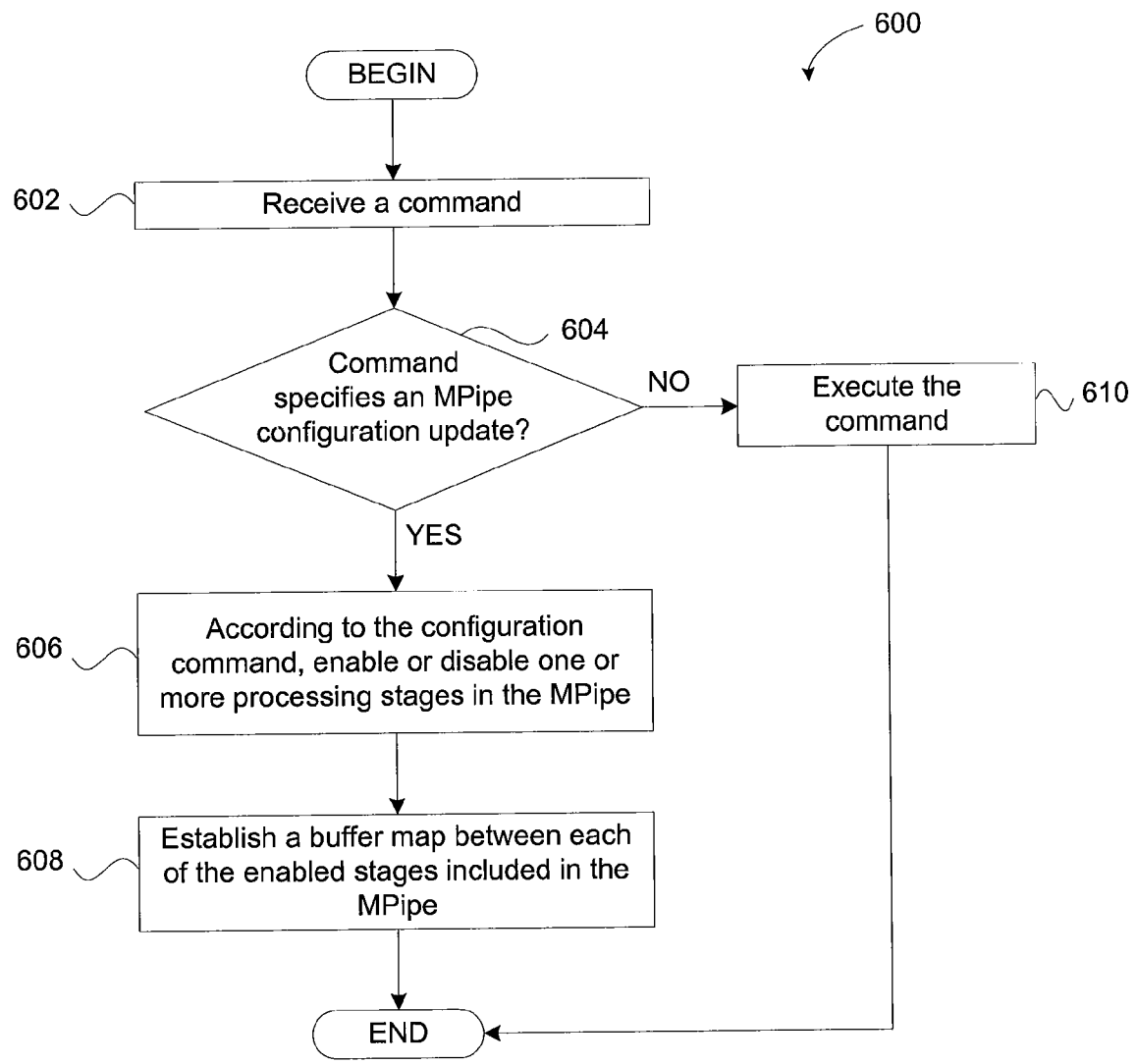
FIG. 6 is a flow diagram of method steps for configuring an MPipe, according to one embodiment of the present invention.

FIG. 6 is a flow diagram of method steps 600 for configuring an MPipe 400, according to one embodiment of the present invention. Although the method steps are described in conjunction with the systems of FIGS. 1-5, persons skilled in the art will understand that any system configured to perform the method steps, in any order, is within the scope of the inventions.

The method 600 begins at step 602, where the parallel processing subsystem 112 receives a command. At step 604, the parallel processing subsystem 112 determines whether the command specifies an MPipe 400 configuration update. The determination 604 may be performed by the front end 212, the work distribution unit 200, or an addition block not shown in FIG. 2. If, at step 604, the parallel processing subsystem 112 determines that the command specifies an MPipe 400 configuration update, then the method 600 proceeds to step 606.

At step 606, the parallel processing subsystem 112, according to the configuration command, enables or disables one or more processing stages included in the MPipe 400. At step 606, the parallel processing subsystem 112 establishes a BMap between each of the enabled stages included in the MPipe 400, according to the techniques described above in conjunction with the AAMT in Table 1 and the BMap generation truth table in Table 3. The method 600 then ends.

Referring back now to step 604, if the parallel processing subsystem 112 determines that the command does not specify an MPipe 400 configuration update, then the method 600 proceeds to step 610. At step 610, the command is executed according to the one or more instructions specified within the command, and the method 600 ends.

Figure 7:
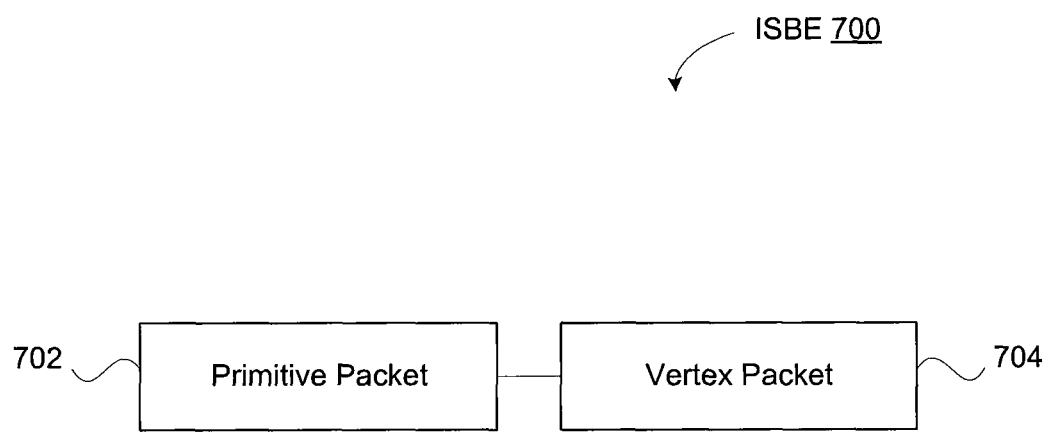
FIG. 7 is a conceptual diagram of a packet format suitable for an MPipe, according to one embodiment of the invention.

In addition, FIG. 7 is a conceptual diagram of a packet format suitable for the MPipe 400, according to one embodiment of the invention. Specifically, the packet of work corresponds to an Inter Stage Buffer Element (ISBE) 700, which includes a vertex packet 704 and a primitive packet 702. Vertex packet 704 contains attribute information, such as color and position information, for multiple vertices. Primitive packet 702 contains topology information for a plurality of primitives, where the topology information selects vertices associated with each primitive, and where the vertices are selected from the vertex packet 704. Because each shader in MPipe 400 defines its expected input data and output data, the ISBE 700 is expected to be configured different at different points in the MPipe. For example, a vertex shader can modify vertex packet 704, and a geometry shader can modify both vertex packet 704 and primitive packet 702. Other types of shaders may even generate multiple output ISBE's, each of which is independent of the others.

To illustrate further, suppose shader A 404 is a vertex shader, and shader A 404 expects to operate on an input primitive of a certain type (e.g., triangle) and generates an output primitive of the same type (e.g., triangle). Here, since the topology information is expected to remain the same, shader A 404 does not modify the primitive packet 702 of the ISBE 700, and instead modifies the data in the vertex packet 704 of the ISBE 700. On the other hand, suppose shader B 406 is a geometry shader, and shader B 406 expects to operate on an input primitive of a first type (e.g., triangle) and generates an output primitive of a second type (e.g., point). Here, since the topology information is expected to change, the ISBE 700 at the output of shader B 406 has different data in the vertex packet 704 and the primitive packet 702 when compared to the ISBE 700 at the input to shader B.

The above description illustrates various embodiments of the invention along with examples of how aspects of the invention may be implemented. The above examples, embodiments, instruction semantics, and drawings should not be deemed to be the only embodiments, and are presented to illustrate the flexibility and advantages of the invention as defined by the following claims.

We claim:

1. A computer-implemented method for reducing the amount of memory required to store vertex data processed within a processing pipeline that includes a plurality of shading engines, the method comprising:
   determining a first active shading engine and a second active shading engine included within the processing pipeline, wherein the second active shading engine receives vertex data output by the first active shading engine;
   receiving an output map that indicates one or more attributes that are included in the vertex data and output by the first active shading engine;
   receiving an input map that indicates one or more attributes that are included in the vertex data and received by the second active shading engine from the first active shading engine; and
   generating a buffer map based on the input map, the output map, and a pre-defined set of rules that includes rule data associated with both the first shading engine and the second shading engine, wherein the buffer map indicates one or more attributes that are included in the vertex data and stored in a memory that is accessible by both the first active shading engine and the second active shading engine, and wherein the rule data include keywords that are configured to cause the first active shading engine and the second active shading engine to interpret the one or more attributes that are included in the vertex data as specified by the keywords.

2. The method of claim 1, wherein the input map and the output map are configured as a bitmasks, and each bit included in each of the bitmasks corresponds to a different attribute that is included in the vertex data.

3. The method of claim 2, wherein the value of each bit included in each of the bitmasks indicates whether the corresponding attribute included in the vertex data is stored in the memory.

4. The method of claim 2, wherein the pre-defined set of rules further includes rule data associated with each of the attributes that are included in the vertex data.

5. The method of claim 4, wherein a value of each bit included in the input map bitmask may be overridden according to the rule data included in the pre-defined set of rules, and wherein a value of each bit included in the output map bitmask may be overridden according to the rule data included in the pre-defined set of rules.

6. The method of claim 5, wherein the step of generating the buffer map comprises performing a logical AND operation between each bit included in the input map bitmask and a corresponding bit included in the output map bitmask.

7. The method of claim 2, wherein the first active shading engine processes the vertex data and outputs only attributes of the vertex data having corresponding bits in the buffer map that are set to a logical value of 1.

8. The method of claim 2, wherein the second active shading engine reads only attributes of the vertex data having corresponding bits in the buffer map that are set to a logical value of 1.

9. The method of claim 1, wherein the first active shading engine and the second active shading engine bypass one or more inactive shading engines included within the processing pipeline.

10. A non-transitory computer-readable storage medium storing instructions that, when executed by a processor, cause a computing device to reduce the amount of memory required to store vertex data processed within a processing pipeline that includes a plurality of shading engines, by performing the steps of:
    determining a first active shading engine and a second active shading engine included within the processing pipeline, wherein the second active shading engine receives vertex data output by the first active shading engine;
    receiving an output map that indicates one or more attributes that are included in the vertex data and output by the first active shading engine;
    receiving an input map that indicates one or more attributes that are included in the vertex data and received by the second active shading engine from the first active shading engine; and
    generating a buffer map based on the input map, the output map, and a pre-defined set of rules that includes rule data associated with both the first shading engine and the second shading engine, wherein the buffer map indicates one or more attributes that are included in the vertex data and stored in a memory that is accessible by both the first active shading engine and the second active shading engine, and wherein the rule data include keywords that are configured to cause the first active shading engine and the second active shading engine to interpret the one or more attributes that are included in the vertex data as specified by the keywords.

11. The non-transitory computer-readable storage medium of claim 10, wherein the input map and the output map are configured as a bitmasks, and each bit included in each of the bitmasks corresponds to a different attribute that is included in the vertex data.

12. The non-transitory computer-readable storage medium of claim 11, wherein the value of each bit included in each of the bitmasks indicates whether the corresponding attribute included in the vertex data is stored in the memory.

13. The non-transitory computer-readable storage medium of claim 11, wherein the pre-defined set of rules further includes rule data associated with each of the attributes that are included in the vertex data.

14. The non-transitory computer-readable storage medium of claim 13, wherein a value of each bit included in the input map bitmask may be overridden according to the rule data included in the pre-defined set of rules, and wherein a value of each bit included in the output map bitmask may be overridden according to the rule data included in the pre-defined set of rules.

15. The non-transitory computer-readable storage medium of claim 14, wherein the step of generating the buffer map comprises performing a logical AND operation between each bit included in the input map bitmask and a corresponding bit included in the output map bitmask.

16. The non-transitory computer-readable storage medium of claim 11, wherein the first active shading engine processes the vertex data and outputs only attributes of the vertex data having corresponding bits in the buffer map that are set to a logical value of 1.

17. The non-transitory computer-readable storage medium of claim 11, wherein the second active shading engine reads only attributes of the vertex data having corresponding bits in the buffer map that are set to a logical value of 1.

18. The non-transitory computer-readable storage medium of claim 10, wherein the first active shading engine and the second active shading engine bypass one or more inactive shading engines included within the processing pipeline.

19. A computer system, comprising:
a processor; and
a memory storing instructions that when executed by the processor cause the computer system to reduce the amount of memory required to store vertex data processed within a processing pipeline that includes a plurality of shading engines, by performing the steps of:
  determining a first active shading engine and a second active shading engine included within the processing pipeline, wherein the second active shading engine receives vertex data output by the first active shading engine;
  receiving an output map that indicates one or more attributes that are included in the vertex data and output by the first active shading engine;
  receiving an input map that indicates one or more attributes that are included in the vertex data and received by the second active shading engine from the first active shading engine; and
  generating a buffer map based on the input map, the output map, and a pre-defined set of rules that includes rule data associated with both the first shading engine and the second shading engine, wherein the buffer map indicates one or more attributes that are included in the vertex data and stored in a memory that is accessible by both the first active shading engine and the second active shading engine, and wherein the rule data include keywords that are configured to cause the first active shading engine and the second active shading engine to interpret the one or more attributes that are included in the vertex data as specified by the keywords.

20. The computer system of claim 19, wherein the input map and the output map are configured as a bitmasks, and each bit included in each of the bitmasks corresponds to a different attribute that is included in the vertex data.

* * * * *